United States Patent
Osumi et al.

(10) Patent No.: US 11,216,964 B2
(45) Date of Patent: Jan. 4, 2022

(54) APPARATUS AND TRAINED-MODEL GENERATION DEVICE

(71) Applicant: CANON MEDICAL SYSTEMS CORPORATION, Otawara (JP)

(72) Inventors: Ryota Osumi, Nasushiobara (JP); Takeshi Sato, Nasushiobara (JP); Takatoshi Okumura, Yaita (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 25 days.

(21) Appl. No.: 16/732,386

(22) Filed: Jan. 2, 2020

(65) Prior Publication Data

US 2020/0234461 A1   Jul. 23, 2020

(30) Foreign Application Priority Data

Jan. 18, 2019 (JP) .............................. JP2019-006523

(51) Int. Cl.
*G06T 7/62*   (2017.01)
*G06T 7/00*   (2017.01)
*G06T 3/00*   (2006.01)

(52) U.S. Cl.
CPC .............. *G06T 7/62* (2017.01); *G06T 3/0068* (2013.01); *G06T 7/0012* (2013.01); *G06T 2207/10132* (2013.01); *G06T 2207/10136* (2013.01); *G06T 2207/20081* (2013.01); *G06T 2207/30044* (2013.01)

(58) Field of Classification Search
CPC ....... G06T 7/62; G06T 7/0012; G06T 3/0068; A61B 8/469; A61B 8/463; A61B 8/5223; A61B 8/5207; G06N 3/02
See application file for complete search history.

(56) References Cited

U.S. PATENT DOCUMENTS

| | | | |
|---|---|---|---|
| 2006/0074315 A1* | 4/2006 | Liang | G06T 7/20 600/450 |
| 2018/0330518 A1* | 11/2018 | Choi | A61B 8/5223 |
| 2019/0261942 A1* | 8/2019 | Yang | A61B 8/5223 |

FOREIGN PATENT DOCUMENTS

| | | |
|---|---|---|
| JP | 6125256 B2 | 5/2017 |
| JP | 2017-221269 A | 12/2017 |

* cited by examiner

*Primary Examiner* — Vu Le
*Assistant Examiner* — Julius Chai
(74) *Attorney, Agent, or Firm* — Oblon, McClelland, Maier & Neustadt, L.L.P.

(57) ABSTRACT

An ultrasound diagnostic apparatus according to an embodiment includes a processing circuitry. The processing circuitry acquires first image data that is image data obtained during the ultrasound scan executed on the object and that is image data before the coordinate conversion corresponding to the format of the ultrasound scan. The processing circuitry uses the trained model generated through the learning using the first image data obtained during the previously executed ultrasound scan and the area including the object in the first image data to estimate the area in the acquired first image data.

13 Claims, 12 Drawing Sheets

APPARATUS AND TRAINED-MODEL GENERATION DEVICE

CROSS-REFERENCE TO RELATED APPLICATIONS

This application is based upon and claims the benefit of priority from Japanese Patent Application No. 2019-006523, filed on Jan. 18, 2019; the entire contents of which are incorporated herein by reference.

FIELD

Embodiments described herein relate generally to an apparatus and a trained-model generation device.

BACKGROUND

For example, there is a known method for estimating the area including the object (e.g., a fetus within the uterus of a pregnant woman) in the currently generated volume data through the learning using the previously generated volume data and the area including the object (fetus) in the volume data. However, in ultrasound image data before coordinate conversion (scan conversion) is executed, in principle, the number of pixels and the resolution vary with a scan direction. Therefore, in post-coordinate conversion ultrasound image data, as the resolution varies with a direction, the variation in the resolution may affect the accuracy of learning and estimation processing.

DETAILED DESCRIPTION

An ultrasound diagnostic apparatus, which is an apparatus according to an embodiment, includes a processing circuitry. The processing circuitry acquires first image data that is image data obtained during the ultrasound scan executed on the object and that is image data before the coordinate conversion corresponding to the format of the ultrasound scan. The processing circuitry uses the trained model generated through the learning using the first image data obtained during the previously executed ultrasound scan and the area including the object in the first image data to estimate the area in the acquired first image data. The first image data may be any image data different from the image data displayed on the display.

With reference to the accompanying drawings, an ultrasound diagnostic apparatus and a trained-model generation device according to embodiments are described below. Embodiments are not limited to the embodiments described below. In principle, details described in one embodiment are also applied to other embodiments.

First Embodiment

Figure 1:
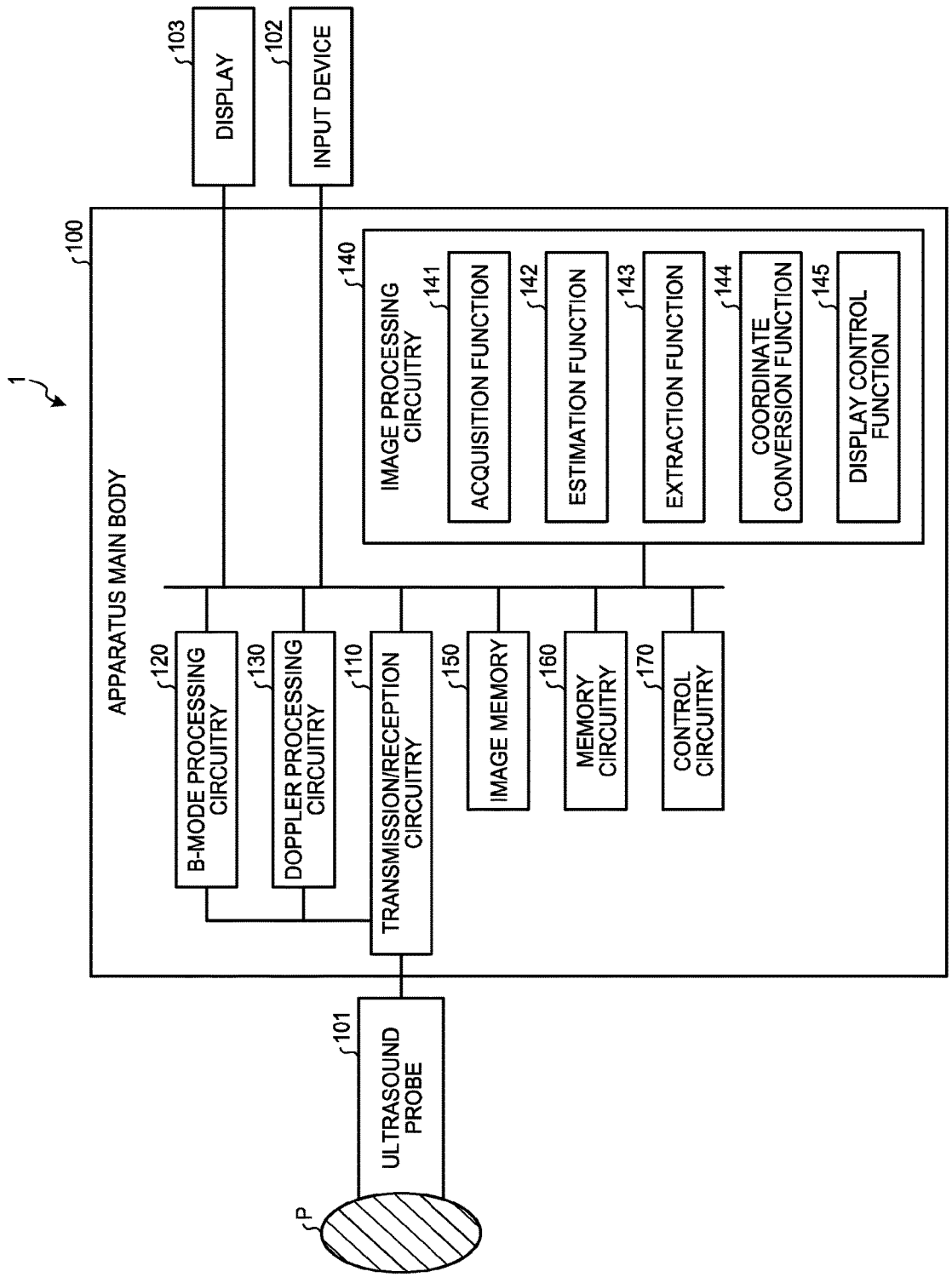
FIG. 1 is a block diagram that illustrates an example of the configuration of an ultrasound diagnostic apparatus according to a first embodiment.

FIG. 1 is a block diagram that illustrates an example of the configuration of an ultrasound diagnostic apparatus 1 according to a first embodiment. As illustrated in FIG. 1, the ultrasound diagnostic apparatus 1 according to the first embodiment includes an apparatus main body 100, an ultrasound probe 101, an input device 102, and a display 103. Each of the ultrasound probe 101, the input device 102, and the display 103 is connected to the apparatus main body 100.

The ultrasound probe 101 executes ultrasound transmission and reception (ultrasound scan). For example, the ultrasound probe 101 is brought into contact with the body surface of a subject P (e.g., the abdomen of a pregnant woman) to execute ultrasound transmission and reception on the area including at least part of a fetus within the uterus of the pregnant woman. The ultrasound probe 101 includes a plurality of piezoelectric oscillators. The piezoelectric oscillators are piezoelectric elements that produce a piezoelectric effect by converting an electric signal (pulse voltage) and a mechanical vibration (vibration due to sound) from each other and generate ultrasound waves based on a drive signal (electric signal) fed from the apparatus main body 100. The generated ultrasound waves are reflected by the acoustic impedance mismatched surface within the subject P and are received by the piezoelectric oscillators as reflected wave signals (electric signals) including for example a component scattered by a scattering substance within tissue. The ultrasound probe 101 sends reflected wave signals received by the piezoelectric oscillators to the apparatus main body 100.

As the ultrasound probe 101, an ultrasound probe having any configuration may be used, such as a 2D array probe in which a plurality of piezoelectric oscillators is arranged in a grid pattern in two dimensions or a mechanical 4D probe in which a plurality of piezoelectric oscillators arranged in one dimension are mechanically swayed to scan a three-dimensional area.

The input device 102 includes a mouse, keyboard, button, panel switch, touch command screen, foot switch, wheel, trackball, joystick, or the like; it receives various setting requests from an operator of the ultrasound diagnostic apparatus 1 and transfers the received various setting requests to the apparatus main body 100. The input device 102 is an example of an input unit.

The display 103 displays a GUI (graphical user interface) for the operator of the ultrasound diagnostic apparatus 1 to input various setting requests by using the input device 102 and displays ultrasound image data, and the like, generated by the apparatus main body 100. The display 103 displays various messages to notify the operator of the processing status of the apparatus main body 100. The display 103 may include a speaker (not illustrated) to output a sound. For example, the speaker of the display 103 outputs a predetermined sound such as a beep sound to notify the operator of the processing status of the apparatus main body 100. The display 103 is an example of a display unit.

The apparatus main body 100 is a device that generates ultrasound image data based on reflected wave signals received by the ultrasound probe 101. The ultrasound image data generated by the apparatus main body 100 may be two-dimensional ultrasound image data generated based on a two-dimensional reflected wave signal or may be three-dimensional ultrasound image data generated based on a three-dimensional reflected wave signal.

As illustrated in FIG. 1, the apparatus main body 100 includes, for example, a transmission/reception circuitry 110, a B-mode processing circuitry 120, a Doppler processing circuitry 130, an image processing circuitry 140, an image memory 150, a memory circuitry 160, and a control circuitry 170. The transmission/reception circuitry 110, the B-mode processing circuitry 120, the Doppler processing circuitry 130, the image processing circuitry 140, the image memory 150, the memory circuitry 160, and the control circuitry 170 are communicatively connected to each other. The apparatus main body 100 is connected to a network 2 within a hospital.

The transmission/reception circuitry 110 controls the ultrasound probe 101 so as to transmit ultrasound waves. For example, the transmission/reception circuitry 110 applies the above-described drive signal (drive pulse) to the ultrasound probe 101 in timing with a predetermined transmission delay time given to each oscillator in accordance with a command from the control circuitry 170. Thus, the transmission/reception circuitry 110 causes the ultrasound probe 101 to transmit an ultrasound beam that is obtained by converging an ultrasound wave into a beam.

The transmission/reception circuitry 110 controls the ultrasound probe 101 so as to receive a reflected wave signal. The reflected wave signal is a signal obtained when an ultrasound wave transmitted from the ultrasound probe 101 is reflected by the body tissue of the subject P, as described above. For example, in accordance with a command from the control circuitry 170, the transmission/reception circuitry 110 performs an addition operation by applying a predetermined delay time to the reflected wave signal received by the ultrasound probe 101. Thus, a reflected component in the direction corresponding to the receive directional characteristics of a reflected wave signal is enhanced. The transmission/reception circuitry 110 converts the reflected wave signal having undergone the addition operation into an in-phase signal (I signal, I: In-phase) and a quadrature signal (Q signal, Q: Quadrature-phase) in a baseband. Then, the transmission/reception circuitry 110 transmits the I signal and the Q signal (hereinafter referred to as IQ signal) as reflected wave data to the B-mode processing circuitry 120 and the Doppler processing circuitry 130. The transmission/reception circuitry 110 may convert the reflected wave signal having undergone the addition operation into an RF (radio frequency) signal and then transmit it to the B-mode processing circuitry 120 and the Doppler processing circuitry 130. The IQ signal and the RF signal are signals (reflected wave data) including phase information.

The B-mode processing circuitry 120 performs various types of signal processing on reflected wave data generated from a reflected wave signal by the transmission/reception circuitry 110. The B-mode processing circuitry 120 performs log amplification, envelope detection processing, or the like, on reflected wave data received from the transmission/reception circuitry 110 to generate data (B-mode data) in which the signal intensity for each sample point (observation point) is represented by using the level of luminance. The B-mode processing circuitry 120 transmits the generated B-mode data to the image processing circuitry 140.

The B-mode processing circuitry 120 performs signal processing to execute harmonic imaging, that is, imaging of harmonic components. Contrast harmonic imaging (CHI) and tissue harmonic imaging (THI) are known as harmonic imaging. Known as a scanning method for contrast harmonic imaging and tissue harmonic imaging are, for example, amplitude modulation (AM), phase modulation (PM) called "pulse subtraction method" or "pulse inversion method", and AMPM that produces the advantages of both the AM and the PM by combining the AM and the PM.

The Doppler processing circuitry 130 generates Doppler data by extracting the kinetic information based on the Doppler effect of a movable object at each sample point within the scan area from the reflected wave data generated from a reflected wave signal by the transmission/reception circuitry 110. The kinetic information on the movable object is information such as the average speed, variance, or power value on the movable object. The movable object is, for example, a blood flow, tissue such as the wall of the heart, or a contrast agent. The Doppler processing circuitry 130 sends the generated Doppler data to the image processing circuitry 140.

For example, when the movable object is a blood flow, the kinetic information on the blood flow is information (blood flow information) such as the average velocity, the variance value, the power, or the like, of the blood flow. The blood flow information is obtained by using, for example, the color Doppler method.

In the color Doppler method, first, ultrasound waves are transmitted and received on the same scan line multiple times, and then signals in a specific frequency band are passed and signals in other frequency bands are attenuated with regard to the signals representing the data string of the reflected wave data at the same position (the same sample point) by using an MTI (moving target indicator) filter. That is, signals (clutter components) caused by stationary tissue or slowly moving tissue are suppressed. Thus, a blood flow signal regarding a blood flow is extracted from the signal representing the data string of reflected wave data. In the color Doppler method, the blood flow information such as the average velocity, the variance value, or the power of the blood flow is estimated from the extracted blood flow signal, and the estimated blood flow information is generated as Doppler data.

The image processing circuitry 140 performs, for example, a process to generate image data (ultrasound image data) and various types of image processing on image data. For example, the image processing circuitry 140 generates two-dimensional B-mode image data, which represents the intensity of a reflected wave with luminance, from two-dimensional B-mode data generated by the B-mode processing circuitry 120. The image processing circuitry 140 generates two-dimensional Doppler image data, which visualizes blood flow information, from two-dimensional Doppler data generated by the Doppler processing circuitry 130. Two-dimensional Doppler image data is velocity image data representing the average velocity of a blood flow, variance image data representing the variance value of a blood flow, power image data representing the power of a blood flow, or image data with a combination thereof. The image processing circuitry 140 generates, as Doppler image data, color Doppler image data in which the blood flow information such as the average velocity, the variance value, or the power of a blood flow is displayed in color or Doppler image data in which one piece of blood flow information is displayed in gray scale.

Typically, the image processing circuitry 140 converts a scan-line signal sequence for ultrasound scan into a scan-line signal sequence in a video format for typically televisions, etc. and generates ultrasound image data for display. Specifically, the image processing circuitry 140 conducts coordinate conversion (scan conversion) in accordance with an ultrasound scan format of the ultrasound probe 101 so as to generate ultrasound image data for display. Other than the coordinate conversion, the image processing circuitry 140 conducts various types of image processing, for example, image processing (smoothing processing) to regenerate an image with the average value of luminance by using multiple image frames having undergone the coordinate conversion, image processing (edge enhancement processing) using a differential filter within an image, or the like. The image processing circuitry 140 synthesizes ultrasound image data with textual information on various parameters, scale marks, body marks, and the like.

That is, B-mode data and Doppler data are ultrasound image data before coordinate conversion, and the image data generated by the image processing circuitry 140 is ultrasound image data for display after coordinate conversion. B-mode data and Doppler data are also called raw data. The image processing circuitry 140 generates post-coordinate conversion two-dimensional ultrasound image data for display from pre-coordinate conversion two-dimensional ultrasound image data.

Furthermore, the image processing circuitry 140 generates post-coordinate conversion three-dimensional ultrasound image data for display from pre-coordinate conversion three-dimensional ultrasound image data. For example, the image processing circuitry 140 executes the coordinate conversion on three-dimensional B-mode data generated by the B-mode processing circuitry 120 to generate three-dimensional B-mode image data. The image processing circuitry 140 executes the coordinate conversion on three-dimensional Doppler data generated by the Doppler processing circuitry 130 to generate three-dimensional Doppler image data.

Furthermore, the image processing circuitry 140 performs a rendering process on volume image data to generate various types of two-dimensional image data for displaying the volume image data on the display 103. The rendering process performed by the image processing circuitry 140 includes, for example, a process to generate MPR image data from volume image data by implementing a multi planer reconstruction (MPR) method. The rendering process performed by the image processing circuitry 140 includes, for example, a volume rendering (VR) process to apply the information on a three-dimensional image so as to generate two-dimensional image data. The rendering process performed by the image processing circuitry 140 includes, for example, a surface rendering (SR) process to extract only the surface information on a three-dimensional image so as to generate two-dimensional image data.

The image processing circuitry 140 stores the generated image data and the image data having undergone various types of image processing in the image memory 150. The image processing circuitry 140 may generate, together with image data, the information indicating the display position of each piece of image data, various types of information for supporting an operation of the ultrasound diagnostic apparatus 1, and additional information regarding diagnosis, e.g., patient information, and store them in the image memory 150.

The image processing circuitry 140 according to the first embodiment performs an acquisition function 141, an estimation function 142, an extraction function 143, a coordinate conversion function 144, and a display control function 145. The acquisition function 141 is an example of an acquiring unit. The estimation function 142 is an example of an estimating unit. The extraction function 143 is an example of an extracting unit. The coordinate conversion function 144 is an example of a coordinate converting unit. The display control function 145 is an example of a display control unit.

Each of the processing functions performed by the acquisition function 141, the estimation function 142, the extraction function 143, the coordinate conversion function 144, and the display control function 145, which are components of the image processing circuitry 140 illustrated in FIG. 1, is recorded in the memory circuitry 160, for example, in the form of program executable by a computer. The image processing circuitry 140 is a processor that reads and executes each program from the memory circuitry 160 to perform the function corresponding to the program. In other words, after having read each program, the image processing circuitry 140 provides each of the functions illustrated in the image processing circuitry 140 of FIG. 1. The processing details of the acquisition function 141, the estimation function 142, the extraction function 143, the coordinate conversion function 144, and the display control function 145 performed by the image processing circuitry 140 are described later.

In the description with reference to FIG. 1, the single image processing circuitry 140 performs each processing function described below; however, a processing circuitry may be configured by combining a plurality of independent processors so that each of the processors executes a program to perform a function.

The term "processor" used in the above description means, for example, a CPU (central processing unit), a GPU (graphics processing unit), or a circuit, such as an application specific integrated circuit (ASIC), a programmable logic device (e.g., a simple programmable logic device (SPLD), a complex programmable logic device (CPLD), or a field programmable gate array (FPGA)). The processor reads a program stored in the memory circuitry 160 and executes it to perform the function. Instead of storing programs in the memory circuitry 160, a configuration may be such that a program is directly installed in a circuitry of the processor. In this case, the processor reads the program installed in the circuitry and executes it to perform the function. With regard to each processor according to the present embodiment, each processor is not always configured as a single circuitry but also configured as a single processor by combining a plurality of independent circuitries so as to perform the function. Components in FIG. 1 may be integrated into a single processor to perform the function.

The image memory 150 and the memory circuitry 160 are a semiconductor memory device such as a RAM (random access memory) or a flash memory, or a storage device such as a hard disk or an optical disk.

The image memory 150 is a memory that stores, as post-coordinate conversion ultrasound image data, image data such as B-mode image data or Doppler image data generated by the image processing circuitry 140. The image memory 150 stores, as pre-coordinate conversion ultrasound image data, image data such as B-mode data generated by the B-mode processing circuitry 120 and Doppler data generated by the Doppler processing circuitry 130. For example, ultrasound image data stored in the image memory 150 may be invoked by the operator after diagnosis so as to become ultrasound image data for display via the image processing circuitry 140.

The memory circuitry 160 stores various types of data such as control programs for performing ultrasound transmission/reception, image processing, and display processing, diagnosis information (e.g., patient ID or findings of a doctor), diagnosis protocols, and various types of body marks. The memory circuitry 160 is used to, for example, store image data stored in the image memory 150 as appropriate. Data stored in the memory circuitry 160 may be transferred to an external device via an interface (not illustrated). The external device is, for example, a PC (personal computer) used by a doctor who conducts image diagnosis, a storage medium such as CD or DVD, or a printer. The memory circuitry 160 is an example of a storage unit. The memory circuitry 160 does not need to be built in the ultrasound diagnostic apparatus 1 as long as it is accessible by the ultrasound diagnostic apparatus 1 via the network 2.

The control circuitry 170 performs the control on the overall process of the ultrasound diagnostic apparatus 1. Specifically, the control circuitry 170 controls the processes of the transmission/reception circuitry 110, the B-mode processing circuitry 120, the Doppler processing circuitry 130, the image processing circuitry 140, etc. based on various setting requests input from the operator via the input device 102 or various control programs and various types of data loaded from the memory circuitry 160.

The transmission/reception circuitry 110, the B-mode processing circuitry 120, the Doppler processing circuitry 130, the image processing circuitry 140, the control circuitry 170, and the like, incorporated in the apparatus main body 100 may be configured by using hardware such as a processor (a CPU (central processing unit), an MPU (microprocessing unit), an integrated circuit, etc.) or may be configured by using a software module program.

The overall configuration of the ultrasound diagnostic apparatus 1 according to the first embodiment is described above. With this configuration, the ultrasound diagnostic apparatus 1 according to the first embodiment may improve the accuracy of the process to estimate the area including the object.

For example, there is a known method for estimating the area including the object (e.g., a fetus within the uterus of a pregnant woman) in the currently generated post-coordinate conversion ultrasound image data through the learning using the previously generated post-coordinate conversion ultrasound image data and the area including the object (fetus) in the post-coordinate conversion ultrasound image data. However, there is the following problem when this method is applied.

Figure 2:
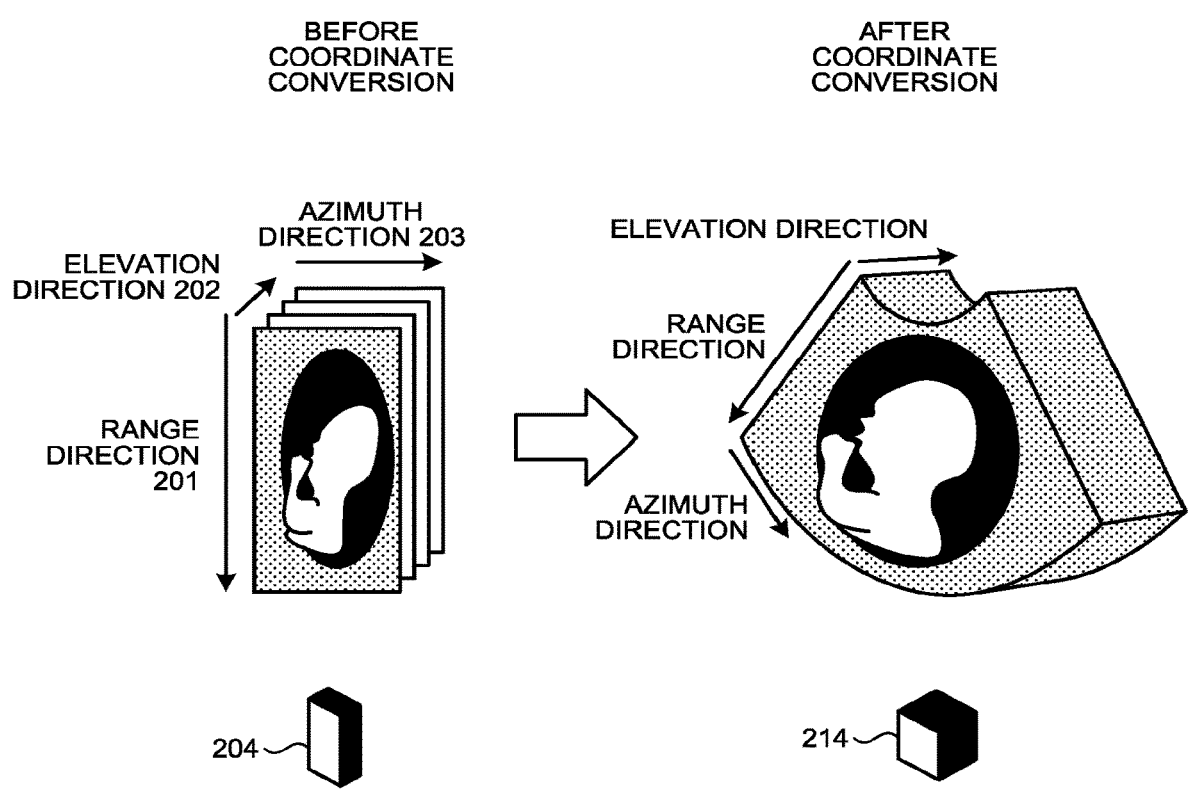
FIG. 2 is a diagram that illustrates the relationship between pre-coordinate conversion ultrasound image data and post-coordinate conversion ultrasound image data.

FIG. 2 is a diagram that illustrates the relationship between pre-coordinate conversion ultrasound image data and post-coordinate conversion ultrasound image data. As illustrated in FIG. 2, in principle, the number of pixels and the resolution considerably vary with a scanning direction in ultrasound image data before the coordinate conversion is executed. In the case of the use of a mechanical 4D probe, which is often used for a fetus, the number of pixels is largest and the resolution is highest in a range direction (sample direction) 201, which is a depth direction, and is second largest and highest in an azimuth direction (raster direction) 202. The number of pixels is smallest and the resolution is lowest in an elevation direction (mechanical scanning direction) 203. Although a voxel 204 in the pre-coordinate conversion ultrasound image data is considerably different in length depending on a direction, a voxel 214 in the post-coordinate conversion ultrasound image data is the same in length in any direction. Therefore, while a rendering process performed on post-coordinate conversion ultrasound image data causes the fetus to seem natural, the resolution in the direction with the highest resolution may affect the accuracy of learning and estimation processing due to different resolutions in the directions.

For example, if the image size of post-coordinate conversion ultrasound image data is matched to the direction with the highest resolution, the sample size in other directions is excessive for the resolution, which results in extra time for learning and estimation processing. If the image size of post-coordinate conversion ultrasound image data is reduced to shorten the time of learning and estimation processing, the resolution in the direction with the highest resolution is degraded due to resampling processing, which results in a degradation in the performance of learning and estimation processing.

In the ultrasound diagnostic apparatus 1 according to the first embodiment, the image processing circuitry 140 estimates the area including the object in the currently acquired pre-coordinate conversion ultrasound image data through the learning using pre-coordinate conversion ultrasound image data obtained during the previously executed ultrasound scan and the area including the object in the pre-coordinate conversion ultrasound image data.

Figure 3:
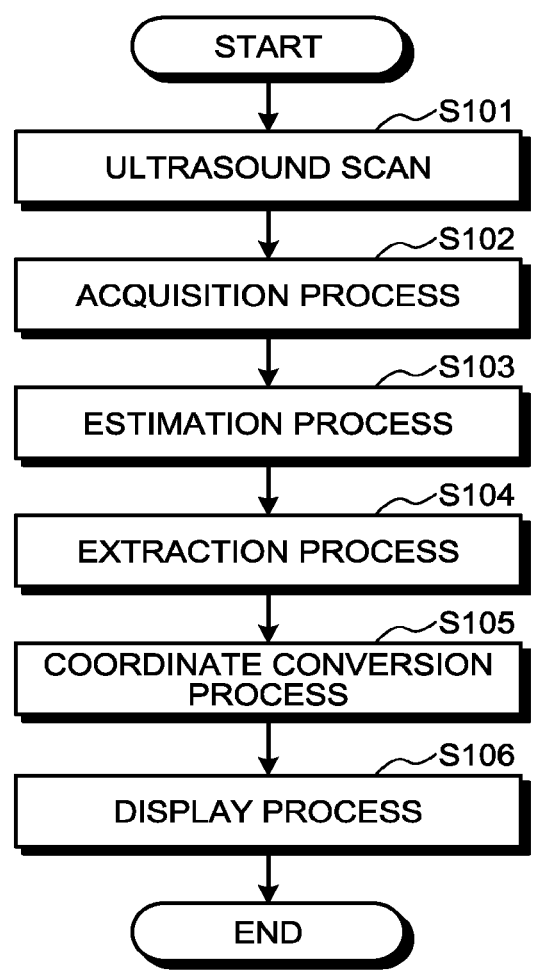
FIG. 3 is a flowchart that illustrates the steps of a process performed by the ultrasound diagnostic apparatus according to the first embodiment.
Figure 4:
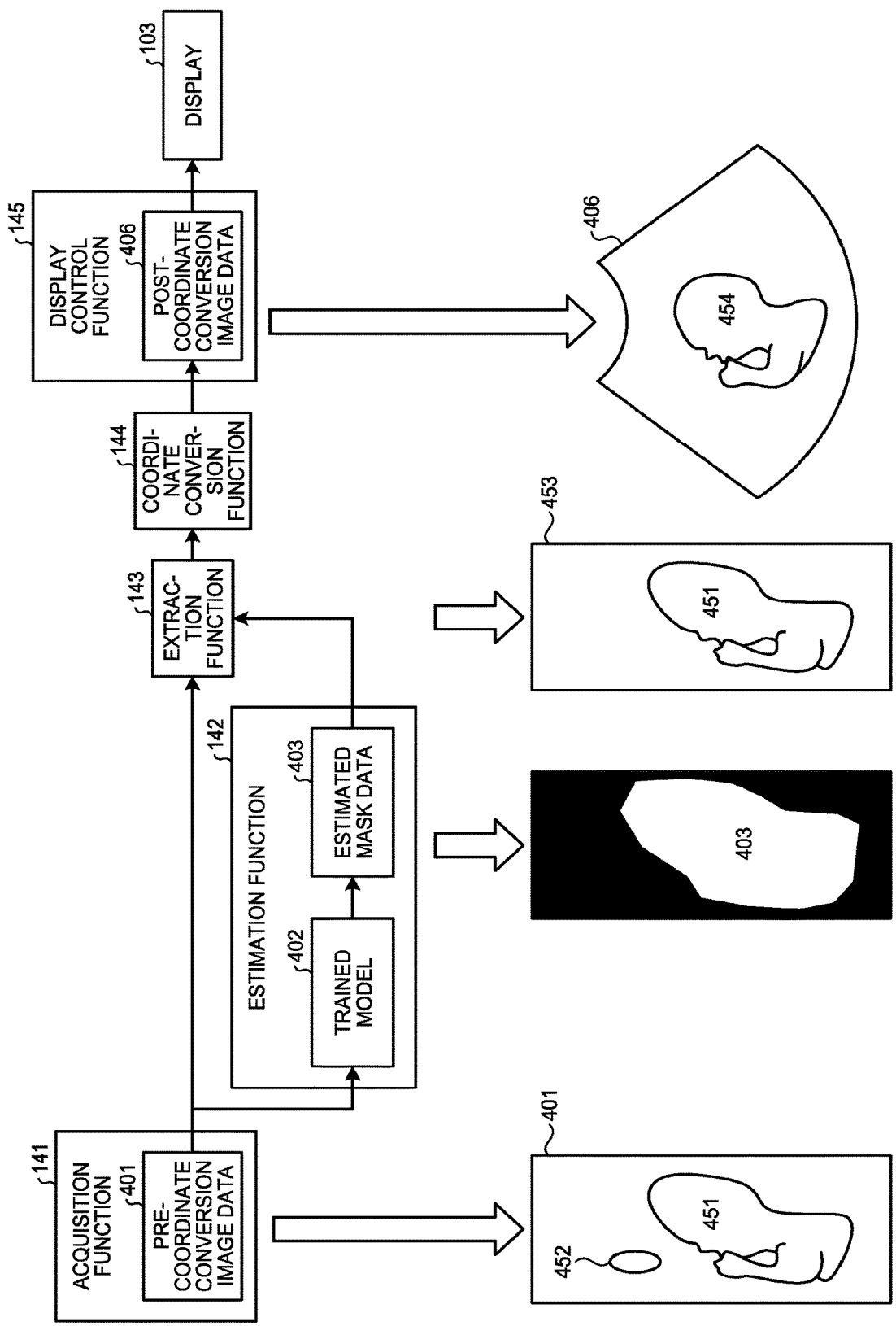
FIG. 4 is a diagram that illustrates a process of an image processing circuitry in the ultrasound diagnostic apparatus according to the first embodiment.

With reference to FIGS. 3 and 4, each of the acquisition function 141, the estimation function 142, the extraction function 143, the coordinate conversion function 144, and the display control function 145 performed by the image processing circuitry 140 is described below.

FIG. 3 is a flowchart that illustrates the steps of the process performed by the ultrasound diagnostic apparatus 1 according to the first embodiment. In FIG. 3, the flowchart for the overall process (image processing method) of the ultrasound diagnostic apparatus 1 is illustrated, and the step in the flowchart corresponding to each component is described. FIG. 4 is a diagram that illustrates a process of the image processing circuitry 140 in the ultrasound diagnostic apparatus 1 according to the first embodiment.

Step S101 in FIG. 3 is a step performed by the ultrasound probe 101. At Step S101, the ultrasound probe 101 is brought into contact with the body surface of the subject P (e.g., the abdomen of a pregnant woman) to execute ultrasound scan on the area including the object (e.g., a fetus within the uterus of the pregnant woman) and obtain a reflected wave signal of the above-described area as a result of the ultrasound scan. The B-mode processing circuitry 120 generates B-mode data based on the reflected wave signal obtained by the ultrasound probe 101. The generated B-mode data is pre-coordinate conversion ultrasound image data.

Specifically, pre-coordinate conversion ultrasound image data (pre-coordinate conversion image data 401 illustrated in FIG. 4) is image data obtained by executing the ultrasound scan and is image data before the coordinate conversion corresponding to the format of the ultrasound scan. Hereinafter, the pre-coordinate conversion image data 401 is referred to as the first image data 401. For example, according to the present embodiment, when a mechanical 4D probe is used as the ultrasound probe 101, the first image data 401 is three-dimensional image data.

Step S102 (acquisition process) in FIG. 3 is a step performed when the image processing circuitry 140 invokes the program corresponding to the acquisition function 141 from the memory circuitry 160. At Step S102, the acquisition function 141 acquires the first image data 401. As illustrated in FIG. 4, the first image data 401 acquired by the acquisition function 141 includes the image representing a fetus 451 and the image representing an artifact 452.

Step S103 (estimation process) in FIG. 3 is a step performed when the image processing circuitry 140 invokes the program corresponding to the estimation function 142 from the memory circuitry 160. At Step S103, the estimation function 142 uses a trained model 402 to estimate the area including the object (fetus) in the first image data 401 acquired by the acquisition function 141 so as to obtain mask data 403 illustrated in FIG. 4.

The trained model 402 is a model generated through the learning using the first image data 401 obtained during the previously executed ultrasound scan and the mask data (learning mask data) representing the area including the object in the first image data 401. Examples of the learning include learning using AI (artificial intelligence) based on a neural network and machine learning. Details of the trained model 402 are described later.

Step S104 (extraction process) in FIG. 3 is a step performed when the image processing circuitry 140 invokes the program corresponding to the extraction function 143 from the memory circuitry 160. At Step S104, the extraction function 143 extracts the area represented by the mask data 403 estimated by the estimation function 142 from the first image data 401 acquired by the acquisition function 141 to obtain second image data 453 illustrated in FIG. 4. The second image data 453 is image data obtained after the image representing the artifact 452, and the like, has been removed from the first image data 401.

Here, the extraction performed by the extraction function 143 is described. For example, the mask data 403 has the same data structure in space as that of the first image data 401, and the position of each pixel in the mask data 403 corresponds to the position of each pixel in the first image data 401. The mask data 403 is binarized by using a threshold; the value "1" is set to display a pixel, and the value "0" is set not to display a pixel. The extraction function 143 calculates the product of the first image data 401 and the mask data 403 on a pixel by pixel basis to obtain the second image data 453 in which the image representing the artifact 452, and the like, has been removed from the first image data 401.

Step S105 (coordinate conversion process) in FIG. 3 is a step performed when the image processing circuitry 140 invokes the program corresponding to the coordinate conversion function 144 from the memory circuitry 160. At Step S105, the coordinate conversion function 144 executes the coordinate conversion on the second image data 453 obtained by the extraction function 143 to obtain post-coordinate conversion image data 406 illustrated in FIG. 4. That is, the second image data 453 is converted into the coordinate system suitable for display so as to obtain the post-coordinate conversion image data 406. The post-coordinate conversion image data 406 is hereinafter referred to as the third image data 406. The third image data 406 includes the image representing a fetus 454 corresponding to the above-described fetus 451.

Step S106 (display process) in FIG. 3 is a step performed when the image processing circuitry 140 invokes the program corresponding to the display control function 145 from the memory circuitry 160. At Step S106, the display control function 145 causes the display 103 to display the third image data 406.

For example, the display control function 145 performs a rendering process (for example, volume rendering) on the third image data 406 to generate a rendering image and causes the display 103 to display the generated rendering image. The display control function 145 generates a cross-sectional image on a predetermined cross-section from the third image data 406 and causes the display 103 to display the generated cross-sectional image. The display control function 145 may cause the display 103 to display a rendering image and a cross-sectional image side by side. For example, the coordinate conversion function 144 may execute the coordinate conversion on the area represented by the mask data 403 estimated by the estimation function 142, and the display control function 145 may generate the curved line indicating the outline of the area having undergone the coordinate conversion by the coordinate conversion function 144 and cause the display 103 to display the generated curved line and the cross-sectional image in a superimposed manner.

Here, the process to generate the trained model 402 through machine learning is described.

The trained model 402 is generated by, for example, a device (hereinafter referred to as the trained-model generation device) different from the ultrasound diagnostic apparatus 1 and stored in the ultrasound diagnostic apparatus 1 (for example, stored in the memory circuitry 160). The trained-model generation device may be implemented by using the ultrasound diagnostic apparatus 1; for example, the trained model 402 may be generated by the ultrasound diagnostic apparatus 1 (e.g., the estimation function 142) and stored in the memory circuitry 160. In the example described below, the trained model 402 is generated by the trained-model generation device and is stored in the ultrasound diagnostic apparatus 1.

Figure 5:
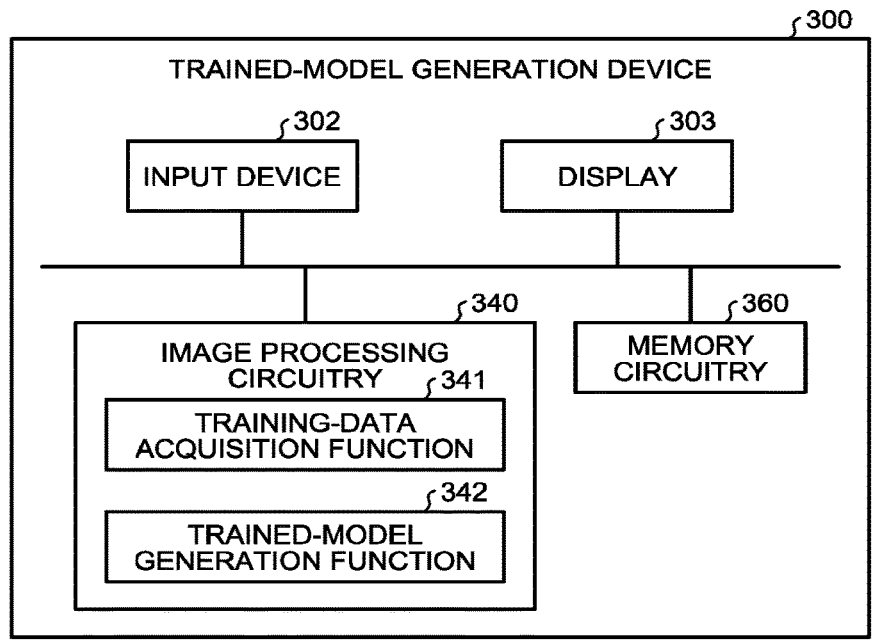
FIG. 5 is a block diagram that illustrates an example of the configuration of a trained-model generation device according to the first embodiment.

FIG. 5 is a block diagram that illustrates an example of the configuration of a trained-model generation device 300 according to the first embodiment. As illustrated in FIG. 5, the trained-model generation device 300 includes an input device 302, a display 303, an image processing circuitry 340, and a memory circuitry 360. The trained-model generation device 300 is used as a viewer that generates the trained model 402 in FIG. 4.

The input device 302 includes a mouse, a keyboard, a button, a panel switch, a touch command screen, a foot switch, a wheel, a trackball, a joystick, or the like, to receive various setting requests from the operator of the trained-model generation device 300 and transfer the received various setting requests to the image processing circuitry 340. The display 303 is a monitor that is viewed by the operator of the trained-model generation device 300.

The image processing circuitry 340 performs the control on the overall process of the trained-model generation device 300. For example, as illustrated in FIG. 5, the image processing circuitry 340 performs a training-data acquisition function 341 and a trained-model generation function 342. The training-data acquisition function 341 is an example of a learning-data acquiring unit. The trained-model generation function 342 is an example of a trained-model generating unit.

The memory circuitry 360 is, for example, a semiconductor memory device such as a RAM or a flash memory, or a storage device such as a hard disk or an optical disk. Each processing function performed by the training-data acquisition function 341 and the trained-model generation function 342, which are components of the image processing circuitry 340, is recorded in the memory circuitry 360 for example in the form of program executable by a computer. The image processing circuitry 340 is a processor that reads and executes each program from the memory circuitry 360 to perform the function corresponding to the program. The memory circuitry 360 stores a training program 502 as an algorithm of the neural network.

Figure 6:
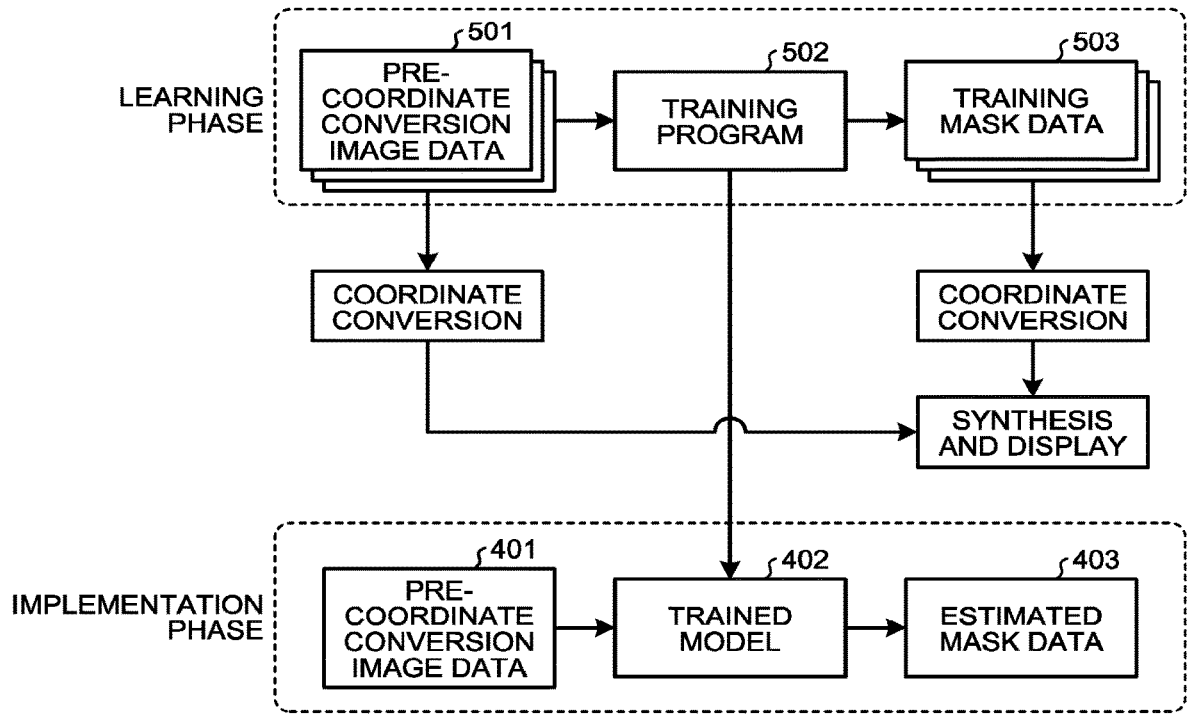
FIG. 6 is a diagram that illustrates an example of machine learning according to the first embodiment.

FIG. 6 is a diagram that illustrates an example of the machine learning according to the first embodiment.

As illustrated in FIG. 6, during the process to generate the trained model 402, the training-data acquisition function 341 of the trained-model generation device 300 first acquires a plurality of data sets that are obtained during the previously executed ultrasound scan. The data sets include first image data 501 (pre-coordinate conversion image data) and training mask data 503.

The first image data 501 is image data obtained during the previously executed ultrasound scan on the object and is image data before the coordinate conversion corresponding to the format of the ultrasound scan. The training mask data 503 is mask data representing the area including the object in the first image data 501. As the algorithm of the neural network is learned through experiences, the data set used for learning does not need to have the same subject.

With regard to each data set, the operator needs to previously generate (depict) the training mask data 503, which is training data, for the first image data 501. The operator may depict the training mask data 503 on the display 303 while the display 303 displays the first image data 501 that is pre-coordinate conversion image data; however, the visibility and the operability for the operator are improved if the training mask data 503 is depicted after the coordinate conversion has been executed on the first image data 501. For this reason, the training mask data 503 is depicted by the operator after the training mask data 503 has been subjected to the coordinate conversion together with the first image data 501 and synthesized with the first image data 501 on the display.

The trained-model generation function 342 of the trained-model generation device 300 uses the training program 502 read from the memory circuitry 160 to learn a mask data pattern from a plurality of data sets. The trained-model generation function 342 generates the trained model 402 that has the function to, in response to the received input data (the first image data 401), estimate the area including the object in the first image data 401 as the mask data 403 and output an output data. For example, the generated trained model 402 is stored in the ultrasound diagnostic apparatus 1 (stored in the memory circuitry 160). The trained model 402 in the memory circuitry 160 is readable by, for example, the estimation function 142 of the ultrasound diagnostic apparatus 1.

During the process using the trained model 402, as illustrated in FIG. 4, the estimation function 142 of the ultrasound diagnostic apparatus 1 receives the first image data 401 as input data. The estimation function 142 uses the trained model 402 read from the memory circuitry 160 to estimate the area including the object in the first image data 401 as the mask data 403 and outputs an estimation result as the output data.

Figure 7:
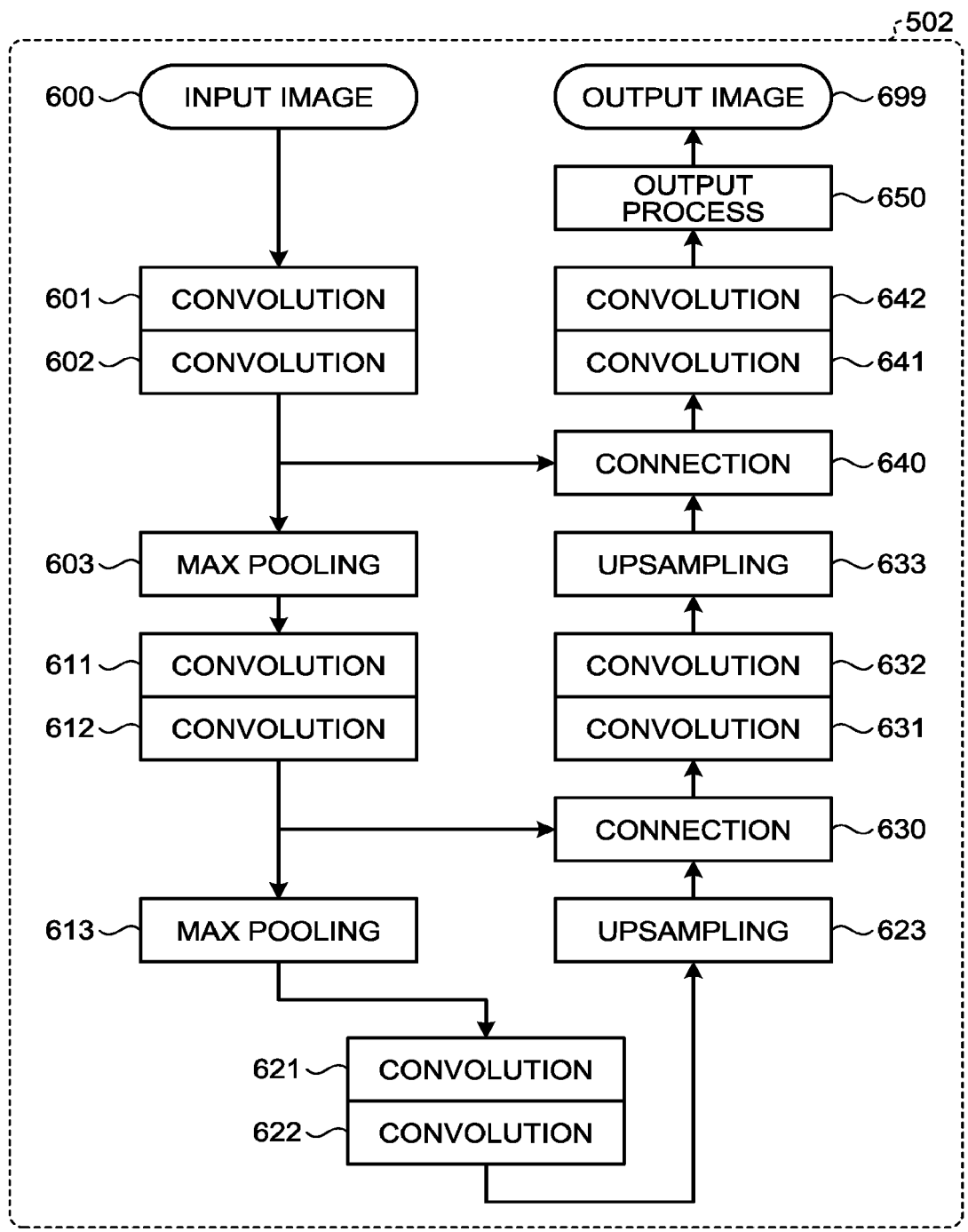
FIG. 7 is a diagram that illustrates an example of a process to generate a trained model according to the first embodiment.

Various techniques are possible for processing using machine learning that is applicable to the present embodiment and, in the present embodiment, U-Net (the U-shaped neural network for medical image segmentation) which is a technique using a convolutional neural network (CNN) is used as an example. FIG. 7 is a diagram that illustrates an example of the process to generate the trained model 402 according to the first embodiment. U-Net is a learning technique combining both the local feature and the overall positional information (global feature) of an object.

In FIG. 7, the functions at respective processing phases of the training program 502 (U-Net) of FIG. 6 are classified into a convolution layer, a max pooling layer, an upsampling layer, a connected layer, and an output processing layer. The convolution layer is a layer that performs a convolution operation on input image data to extract a feature value. For the process to extract a feature value, for example, the ReLU (Rectified Linear Unit) function is used as an activation function. The max pooling layer is a layer that executes downsampling on image data to compress a feature value. The upsampling layer is a layer that executes upsampling. The connected layer is a layer that calculates the weighted sum from the extracted feature values to connect two sets of image data. The output processing layer is a layer that outputs an estimation result from the weighted sum.

Processing of U-Net is broadly divided into a contracting path (the path on the left side of FIG. 7) and an expanding path (the path on the right side of FIG. 7).

For example, in the contracting path, the first image data 501 (pre-coordinate conversion image data) is an input image 600, and convolution layers 601 and 602 perform a convolution operation on the input image 600. A max pooling layer 603 executes downsampling on the output from the convolution layer 602, and convolution layers 611 and 612 execute a convolution operation on the output from the max pooling layer 603. A max pooling layer 613 executes downsampling on the output from the convolution layer 612, and convolution layers 621 and 622 perform a convolution operation on the output from the max pooling layer 613.

Then, in the expanding path, an upsampling layer 623 executes upsampling on the output from the convolution layer 622, and a connected layer 630 connects the output from the upsampling layer 623 and the output from the convolution layer 612. Convolution layers 631 and 632 execute a convolution operation on the output from the connected layer 630. An upsampling layer 633 executes upsampling on the output from the convolution layer 632, and a connected layer 640 connects the output from the upsampling layer 633 and the output from the convolution layer 602. Convolution layers 641 and 642 execute a convolution operation on the output from the connected layer 640, and an output processing layer 650 outputs the output from the convolution layer 642 as an output image 699 (the training mask data 503).

In the contracting path, the resolution of image data is repeatedly reduced due to max pooling so that, in a deeper layer, a broader feature of the object may be obtained. In the expanding path, a convolution operation is repeatedly performed on the result of the connection of post-upsampling image data and image data at the same level in the contracting path so as to restore the resolution. As a result, the input image 600 and the output image 699 have the same image size and, due to various types of processing in the contracting path and the expanding path, both the local feature and the overall positional information (global feature) of the object may be obtained.

When U-Net is used as the configuration of the network, the error function e(w) is defined as a cross-entropy error function according to Equation (1) where, as its parameters, w is a weight, y(x,w) is an output for input x, and t is the target variable for y.

$$E(w) = -\Sigma_{n-1}^{N}\Sigma_{k-1}^{K} t_{kn} \ln y_k(x_n, w) \qquad (1)$$

Here, when the activation function a(x,w) is used in a convolution layer, y is defined as, for example, a softmax function according to Equation (2), and learning is executed due to the optimization for obtaining w with which the error function E is minimum.

$$y_k(x, w) = \frac{\exp(a_k(x, w))}{\Sigma_j \exp(a_j(x, w))} \qquad (2)$$

Other various models, such as SegNet (a neural network for high-speed and memory-saving image segmentation), as well as U-Net may be used as the configuration of the network, and there is no limitation on this. In addition to a softmax function, a logistic sigmoid function, or the like, may be used for the calculation of an error function for learning.

As described above, in the ultrasound diagnostic apparatus 1 according to the first embodiment, the image processing circuitry 140 estimates the area including the object in the currently acquired pre-coordinate conversion ultrasound image data through the learning using the pre-coordinate conversion ultrasound image data obtained during the previously executed ultrasound scan and the area including the object in the pre-coordinate conversion ultrasound image data. For example, in the method for estimating the area including the object in the post-coordinate conversion ultrasound image data, as described above, if the image size of the post-coordinate conversion ultrasound image data is matched to the direction with the highest resolution, the sample size in other directions is excessive for the resolution, which results in extra time for learning and estimation processing. If the image size of post-coordinate conversion ultrasound image data is reduced to shorten the time of learning and estimation processing, the resolution in the direction with the highest resolution is degraded due to resampling processing, which results in a degradation in the performance of learning and estimation processing. Conversely, in the ultrasound diagnostic apparatus 1 according to the first embodiment, as the area including the object is estimated from pre-coordinate conversion ultrasound image data, there is no need to match the image size to the direction with the highest resolution, and therefore the processing time for learning and estimation may be reduced as compared with the method for estimating the area including the object from post-coordinate conversion ultrasound image data. Furthermore, in the ultrasound diagnostic apparatus 1 according to the first embodiment, as the area including the object is estimated from pre-coordinate conversion ultrasound image data, the image size does not need to be reduced, and the accuracy of learning and estimation processing is not affected as compared with the method for estimating the area including the object from post-coordinate conversion ultrasound image data. Therefore, with the ultrasound diagnostic apparatus 1 according to the first embodiment, it is possible to improve the accuracy of the process to estimate the area including the object.

Second Embodiment

In the case described according to the above-described first embodiment, the coordinate conversion process is performed after the extraction process is performed. In the case described according to a second embodiment, the extraction process is performed after the coordinate conversion process is performed. The ultrasound diagnostic apparatus 1 according to the second embodiment is different from the ultrasound diagnostic apparatus 1 illustrated in FIG. 1 in part of processing. Hereinafter, the part having the same configuration as the configuration described in the first embodiment is denoted by the same reference numeral as that in FIG. 1, and description is omitted.

Figure 8:
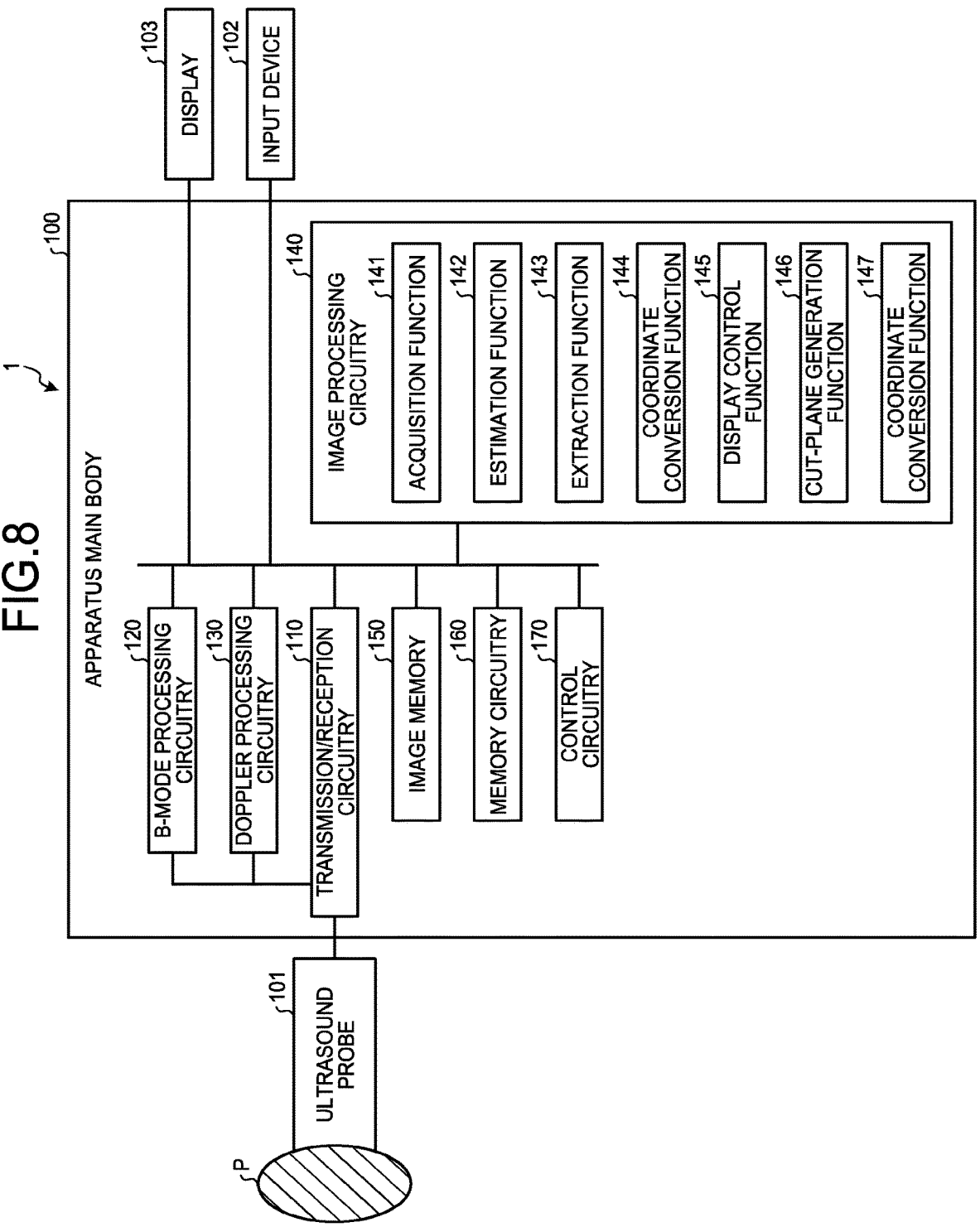
FIG. 8 is a block diagram that illustrates an example of the configuration of the ultrasound diagnostic apparatus according to a second embodiment.

FIG. 8 is a block diagram that illustrates an example of the configuration of the ultrasound diagnostic apparatus 1 according to the second embodiment. As illustrated in FIG. 8, the image processing circuitry 140 according to the second embodiment further performs a cut-plane generation function 146 and a coordinate conversion function 147. The coordinate conversion functions 144 and 147 are examples of a first coordinate converting unit and a second coordinate converting unit, respectively.

Figure 9:
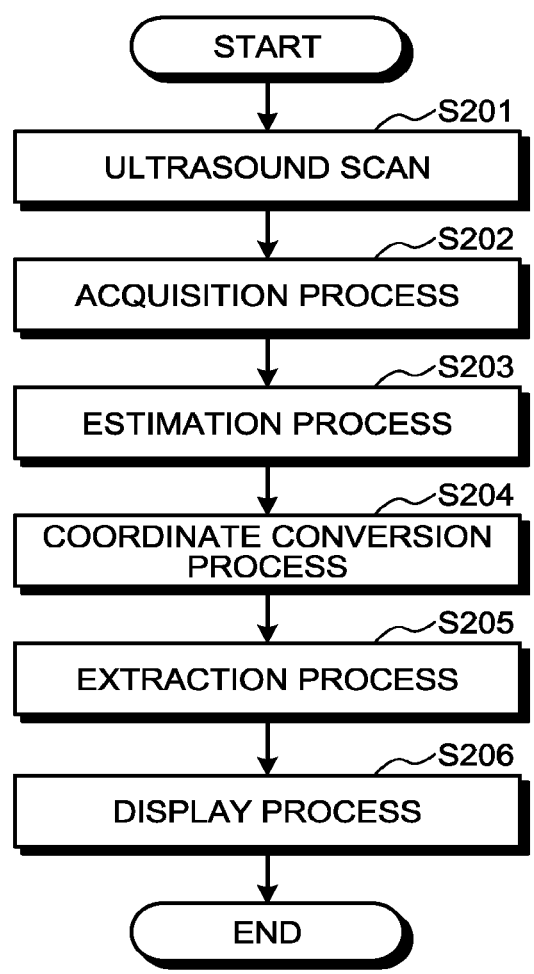
FIG. 9 is a flowchart that illustrates the steps of a process performed by the ultrasound diagnostic apparatus according to the second embodiment.
Figure 10:
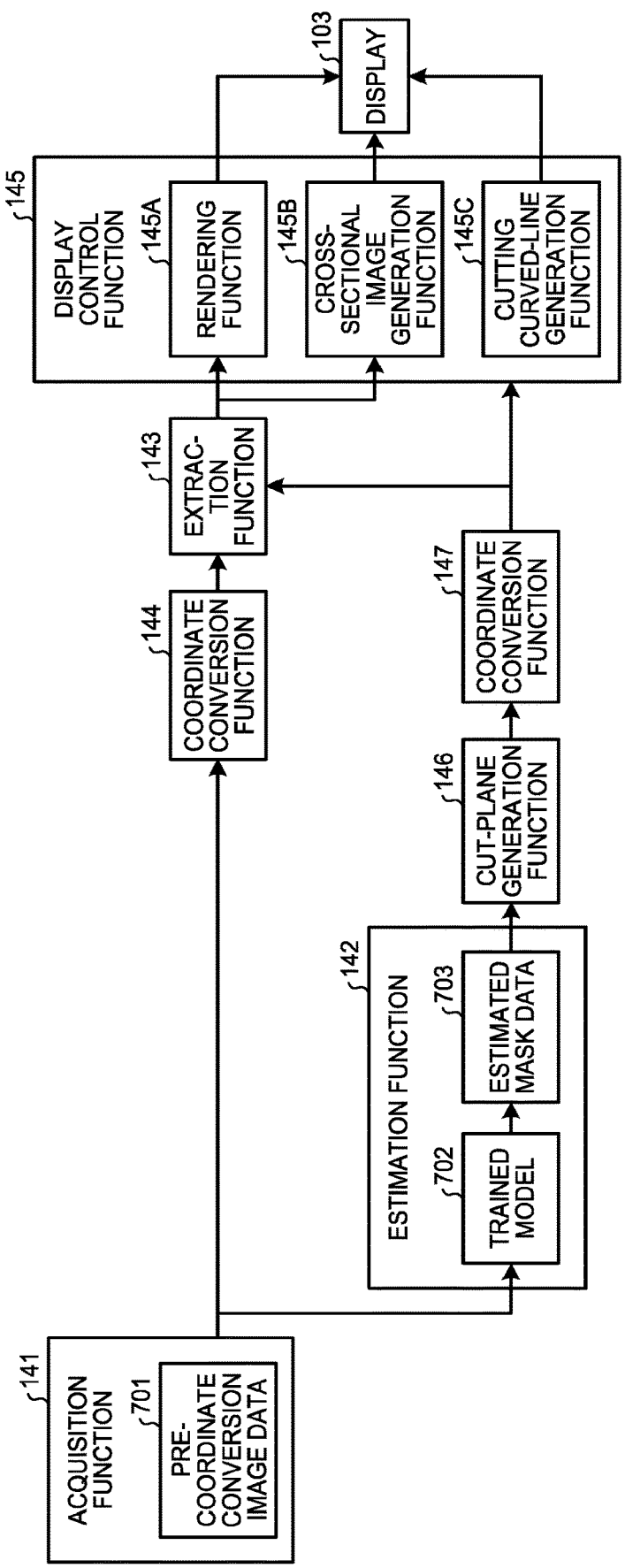
FIG. 10 is a diagram that illustrates a process performed by the image processing circuitry in the ultrasound diagnostic apparatus according to the second embodiment.
Figure 11:
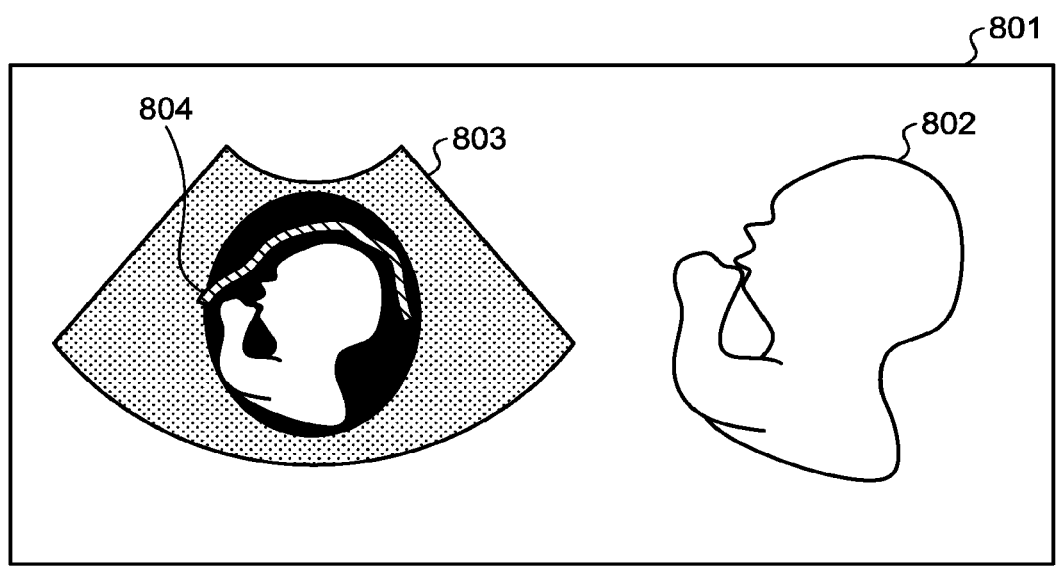
FIG. 11 is a diagram that illustrates a process performed by the image processing circuitry in the ultrasound diagnostic apparatus according to the second embodiment.

Next, with reference to FIGS. 9 to 11, each of the acquisition function 141, the estimation function 142, the extraction function 143, the coordinate conversion function 144, the display control function 145, the cut-plane generation function 146, and the coordinate conversion function 147 performed by the image processing circuitry 140 is described.

FIG. 9 is a flowchart that illustrates the steps of a process performed by the ultrasound diagnostic apparatus 1 according to the second embodiment. In FIG. 9, the flowchart for the overall process (image processing method) of the ultrasound diagnostic apparatus 1 is illustrated, and the step in the flowchart corresponding to each component is described. FIGS. 10 and 11 are diagrams that illustrate a process performed by the image processing circuitry 140 in the ultrasound diagnostic apparatus 1 according to the second embodiment.

Step S201 in FIG. 9 is a step performed by the ultrasound probe 101. At Step S201, the ultrasound probe 101 is brought into contact with the body surface of the subject P (e.g., the abdomen of a pregnant woman) to execute ultrasound scan on the area including the object (e.g., a fetus within the uterus of the pregnant woman) and obtain a reflected wave signal of the above-described area as a result of the ultrasound scan. The B-mode processing circuitry 120 generates B-mode data based on the reflected wave signal obtained by the ultrasound probe 101. The generated B-mode data is pre-coordinate conversion ultrasound image data.

Specifically, the pre-coordinate conversion ultrasound image data (pre-coordinate conversion image data 701 illustrated in FIG. 10) is image data obtained by executing the ultrasound scan and is image data before the coordinate conversion corresponding to the format of the ultrasound scan. Hereinafter, the pre-coordinate conversion image data 701 is referred to as the first image data 701. For example, according to the present embodiment, when a mechanical 4D probe is used as the ultrasound probe 101, the first image data 701 is three-dimensional image data.

Step S202 (acquisition process) in FIG. 9 is a step performed when the image processing circuitry 140 invokes the program corresponding to the acquisition function 141 from the memory circuitry 160. At Step S202, the acquisition function 141 acquires the first image data 701. The first image data 701 acquired by the acquisition function 141 includes the image representing a fetus and the image representing an artifact.

Step S203 (estimation process) in FIG. 9 is a step performed when the image processing circuitry 140 invokes the program corresponding to the estimation function 142 from the memory circuitry 160. At Step S203, the estimation function 142 uses a trained model 702 to estimate the area including the object (fetus) in the first image data 701 acquired by the acquisition function 141 so as to obtain mask data 703.

The trained model 702 is a model generated through the learning using the first image data 701 obtained during the previously executed ultrasound scan and the mask data (learning mask data) representing the area including the object in the first image data 701. Examples of the learning include learning using AI based on a neural network and machine learning. As the details of the trained model 702 are the same as those of the trained model 402, description is omitted.

Step S204 (coordinate conversion process) in FIG. 9 is a step performed when the image processing circuitry 140 invokes the programs corresponding to the cut-plane generation function 146 and the coordinate conversion functions 144 and 147 from the memory circuitry 160. At Step S204, the cut-plane generation function 146 first generates, as a cut plane, the area represented by the mask data 703 estimated by the estimation function 142.

Then, at Step S204, the coordinate conversion function 144 executes the coordinate conversion on the first image data 701 acquired by the acquisition function 141 to obtain second image data as post-coordinate conversion image data. That is, the first image data 701 is converted into the coordinate system suitable for display so that the second image data is obtained. The coordinate conversion function 147 executes the coordinate conversion on the cut plane (the area representing the mask data 703). That is, the cut plane (area) is converted into the coordinate system suitable for display so that a post-coordinate conversion area is obtained.

Step S205 (extraction process) in FIG. 9 is a step performed when the image processing circuitry 140 invokes the program corresponding to the extraction function 143 from the memory circuitry 160. At Step S205, the extraction function 143 extracts the cut plane (area), on which the coordinate conversion function 147 has executed the coordinate conversion, from the second image data obtained by the coordinate conversion function 144 to obtain third image data. The third image data is image data obtained after the image representing an artifact, or the like, has been removed from the second image data.

Step S206 (display process) in FIG. 9 is a step performed when the image processing circuitry 140 invokes the program corresponding to the display control function 145 from the memory circuitry 160. At Step S206, the display control function 145 causes the display 103 to display the third image data.

As illustrated in FIG. 10, the display control function 145 includes a rendering function 145A, a cross-sectional image generation function 145B, and a cutting curved-line generation function 145C. The rendering function 145A is an example of a rendering unit. The cross-sectional image generation function 145B is an example of a cross-sectional image generating unit. The cutting curved-line generation function 145C is an example of a curved-line generating unit.

The rendering function 145A performs a rendering process (e.g., volume rendering) on the third image data to generate a rendering image 802 illustrated in FIG. 11. The cross-sectional image generation function 145B generates a cross-sectional image 803 on a predetermined cross-section from the third image data. The display control function 145 causes the display 103 to display a display data 801 illustrated in FIG. 11 in which the rendering image 802 generated by the rendering function 145A and the cross-sectional image 803 generated by the cross-sectional image generation function 145B are arranged side by side.

The cutting curved-line generation function 145C generates a cutting curved line 804 illustrated in FIG. 11. The cutting curved line 804 represents the outline of the cut plane (area) on a predetermined cross-section after the coordinate conversion function 147 executes the coordinate conversion. The display control function 145 causes the display 103 to display the cutting curved line 804 generated by the cutting curved-line generation function 145C and the cross-sectional image 803 in a superimposed manner.

According to the second embodiment, as illustrated in FIG. 11, the screen is vertically divided so that the cross-sectional image 803 and the cutting curved line 804 are displayed in a superimposed manner on one of the two divided screens; however, the screen may be divided into any number of portions, and a cross-sectional image displayed on the divided screen is not limited to one cross-section. For example, according to the second embodiment, two cross-sections (e.g., section A and section B) or three cross-sections (section A, section B, and section C) may be displayed as cross-sectional images alongside the rendering image 802 and the cutting curved line corresponding to each cross-section may be also displayed.

First Modification

According to the second embodiment, during the extraction process, the extraction function 143 extracts the cut plane (area), on which the coordinate conversion function 147 has executed the coordinate conversion, from the second image data obtained by the coordinate conversion function 144 to obtain the third image data. However, this is not a limitation. According to a first modification, the operator may change the outline representing the cut plane (area) to prevent the area representing a fetus from being removed from the second image data.

Figure 12:
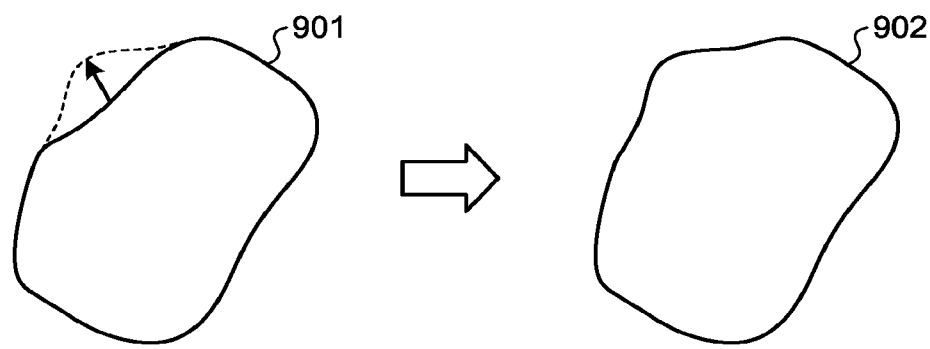
FIG. 12 is a diagram that illustrates a process performed by the image processing circuitry in the ultrasound diagnostic apparatus according to a first modification.

For example, before the extraction process is performed, the display control function 145 causes the display 103 to display the second image data and the cut plane (area) having undergone the coordinate conversion in a superimposed manner so as to receive the operator's operation to change an outline 901 representing the cut plane (area). For example, the display control function 145 causes the display 103 to display the message "change this area?", etc. The operator uses the input device 102 to change the outline 901 on the display 103 to, for example, an outline 902 illustrated in FIG. 12. Then, during the extraction process, the extraction function 143 extracts the area changed due to the operator's operation from the second image data obtained by the coordinate conversion function 144 to obtain the third image data.

Second Modification

According to the first embodiment, during the extraction process, the extraction function 143 extracts the area represented by the mask data 403 estimated by the estimation function 142 from the first image data 401 acquired by the acquisition function 141 to obtain the second image data 453. However, this is not a limitation. According to a second modification, the operator may select one of the areas that are prepared for the mask data 403 at the learning phase so as not to remove the area representing a fetus from the first image data 401.

Figure 13:
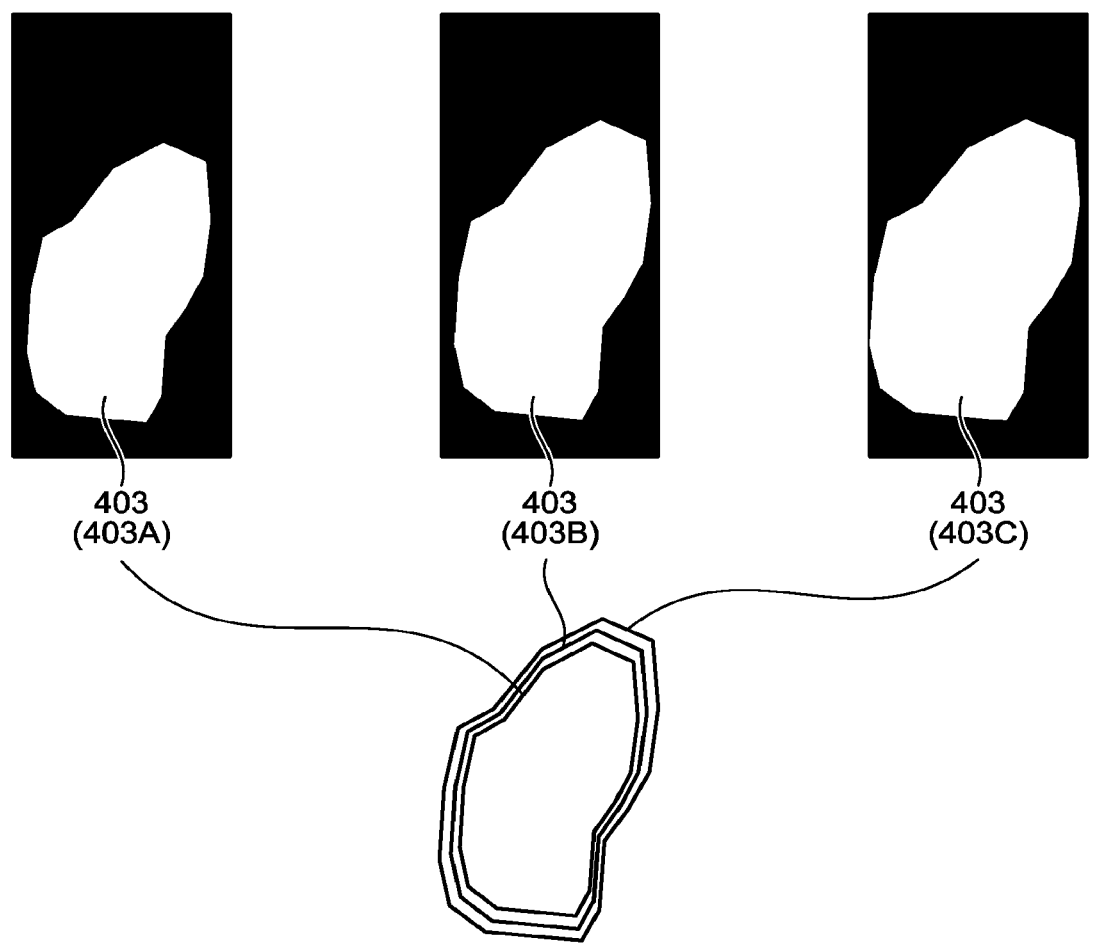
FIG. 13 is a diagram that illustrates a process performed by the image processing circuitry in the ultrasound diagnostic apparatus according to a second modification.

First, during the estimation process, the trained model 402 relates and outputs, with regard to each pixel of the first image data 401 acquired by the acquisition function 141, the degree of certainty of being the area representing a fetus. As illustrated in FIG. 13, the estimation function 142 estimates, as the mask data 403, a plurality of areas 403A to 403C that are set by using different thresholds in accordance with the degree of certainty. The areas 403A to 403C are binarized by using a threshold; the value "1" is set to display a pixel, and the value "0" is set not to display a pixel.

For example, after the estimation process is performed and before the extraction process is performed, the display control function 145 causes the display 103 to display the first image data 401 and the areas 403A to 403C, which are the mask data 403, and receives the operator's operation to select one of the areas 403A to 403C. For example, the display control function 145 causes the display 103 to display the message "which area?", etc. Here, the visibility and the operability are improved if the operator selects one of the areas in a state where the coordinate conversion has been performed on the first image data 401 and the mask data 403 (the areas 403A to 403C). Therefore, the areas 403A to 403C, together with the first image data 401, are subjected to the coordinate conversion and synthesized with the first image data 401 on the display 103, and one area (e.g., the area 403C) is selected in accordance with the operator's operation. Then, during the extraction process, the extraction function 143 extracts the area (the area 403C), which has been selected in accordance with the operator's operation, from the first image data 401 acquired by the acquisition function 141 to obtain the second image data 453.

Alternatively, during the extraction process after the estimation process is performed, the extraction function 143 extracts each of the areas 403A to 403C, which are the mask data 403, from the first image data 401 acquired by the acquisition function 141 to acquire a plurality of sets of second image data. The display control function 145 causes the display 103 to display the first image data 401 and the plurality of sets of second image data obtained by the extraction function 143 and receives the operator's operation to select one of the plurality of sets of second image data as the second image data 453. For example, the display control function 145 causes the display 103 to display the message "which image data?", etc. Here, the visibility and the operability are improved if the operator selects one of the sets of second image data in a state where the coordinate conversion has been performed on the first image data 401 and the sets of second image data. Therefore, the sets of second image data, together with the first image data 401, are subjected to the coordinate conversion and synthesized with the first image data 401 on the display 103, and one of the sets of second image data is selected in accordance with the operator's operation. That is, the second image data 453 is selected.

Other Modifications

Embodiments are not limited to the above-described embodiments. For example, the image processing circuitry 140 may be a workstation separately provided from the ultrasound diagnostic apparatus 1. In this case, the workstation includes the same processing circuitry as the image processing circuitry 140 to perform the above-described process.

Figure 14:
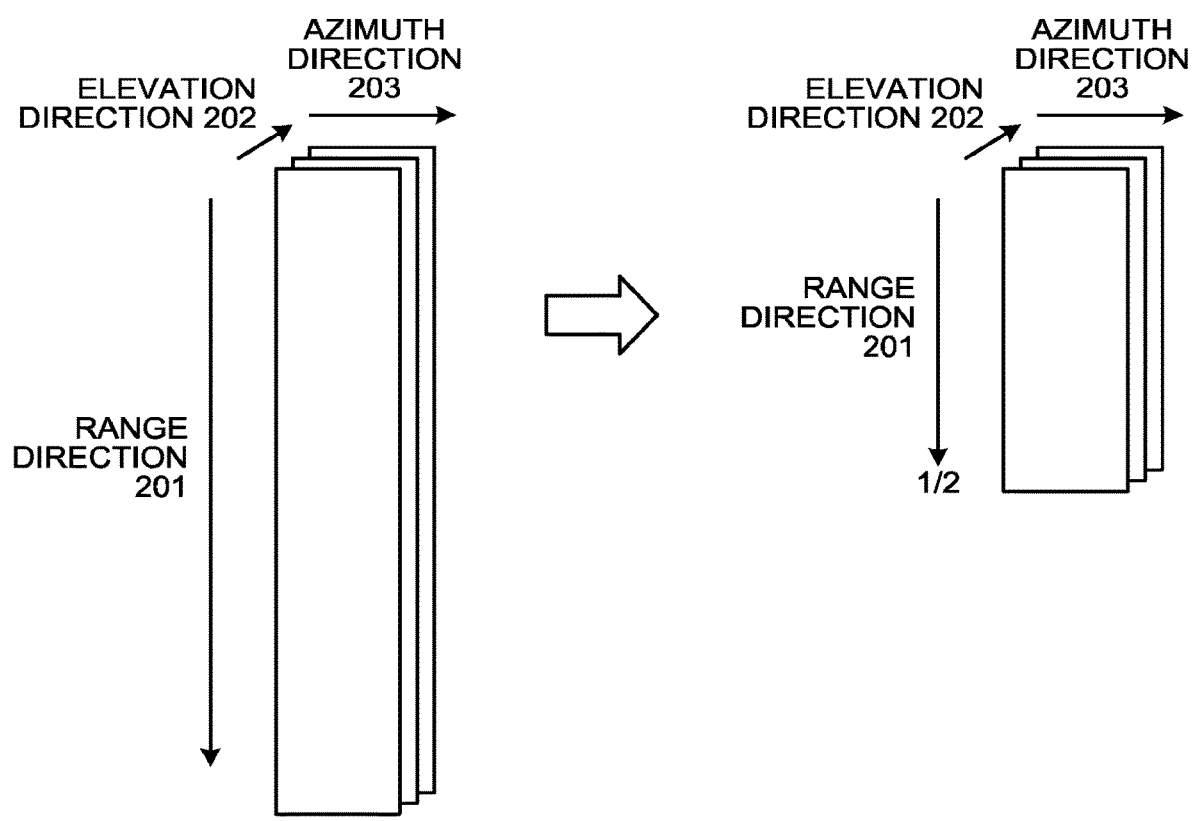
FIG. 14 is a diagram that illustrates a process performed by the image processing circuitry in the ultrasound diagnostic apparatus according to a different modification.

As illustrated in FIG. 14, pre-scan conversion image data (the first image data according to the first embodiment and the second embodiment) has characteristics such that the resolution is substantially high and the number of pixels is substantially large in the range direction (sample direction) 201 as compared with other directions. Therefore, according to the present embodiment, the quality of learning and estimation is not largely affected if data is decimated by approximately ½ in the range direction 201. Thus, learning and estimation may be executed after the first image data is decimated in the range direction (depth direction).

For example, in the case according to the first embodiment, at the learning phase, the training-data acquisition function 341 of the trained-model generation device 300 decimates, in the range direction, the image data obtained during the previously executed ultrasound scan on the object (fetus) and acquires, as a data set, the first image data 501 that has not been decimated in the range direction and the training mask data 503 that is the area including the fetus in the first image data 501. The trained-model generation function 342 of the trained-model generation device 300 learns an area pattern from the acquired data set to generate the trained model 402. During the acquisition process, the acquisition function 141 of the ultrasound diagnostic apparatus 1 decimates, in the range direction, the image data obtained during the ultrasound scan executed on the object (fetus) and acquires the first image data 401 that has not been decimated in the range direction. Then, during the estimation process, the estimation function 142 of the ultrasound diagnostic apparatus 1 uses the trained model 402 to estimate, as the mask data 403, the area including the fetus in the first image data 401 acquired by the acquisition function 141.

In the description according to the present embodiment, the object is a fetus; however, the object does not need to be a fetus and may be a specific site, e.g., the heart, other than a fetus. When the present embodiment is applied to the heart, for example, the acquisition process, the estimation process, the extraction process, the coordinate conversion process, and the display process described above may be performed on the cardiac muscle.

In the case described according to the present embodiment, for example, a mechanical 4D probe is used as the ultrasound probe 101; however, this is not a limitation, and it is possible to use, for example, a 2D array probe in which a plurality of piezoelectric oscillators are arranged in a grid pattern in two dimensions.

Each of the components of each device illustrated in the embodiments is conceptual in terms of functionality and does not necessarily need to be physically configured as illustrated in the drawings. Specifically, the specific forms of separation and combination of devices are not limited to those illustrated in the drawings, and a configuration may be such that all or some of them are functionally or physically separated or combined in any unit depending on various types of loads or usage. All or any of the various processing functions performed by each device may be implemented by a CPU and a program analyzed and executed by the CPU or may be implemented by wired logic hardware.

The method described in the above-described embodiment may be implemented when a prepared image processing program is executed by a computer such as a personal computer or a workstation. The image processing program may be distributed via a network such as the Internet. The image processing program may be recorded in a non-transitory recording medium readable by a computer, such as a hard disk, a flexible disk (FD), a CD-ROM, an MO, or a DVD, and may be read and executed from the recording medium by the computer.

As described above, according to each of the embodiments, it is possible to improve the accuracy of a process to estimate the area including the object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus comprising processing circuitry configured to:
   acquire first image data that is image data obtained during ultrasound scan executed on an object and that is image data before coordinate conversion corresponding to a format of the ultrasound scan,
   use a trained model generated through learning using the first image data obtained during the previously executed ultrasound scan and an area including the object in the first image data to estimate the area in the acquired first image data,
   extract the estimated area from the acquired first image data to obtain second image data,
   execute the coordinate conversion on the second image data to obtain third image data, and
   cause a display to display the third image data.

2. The apparatus according to claim 1, wherein
   the trained model relates and outputs, with regard to each pixel of the acquired first image data, a degree of certainty of being the area, and
   the processing circuitry is further configured to:
      estimate a plurality of areas that are set by using different thresholds in accordance with the degree of certainty,
      before the extracting is executed, receive an operator's operation to select one of the areas, and
      extract the area selected in accordance with the operator's operation from the first image data to obtain the second image data.

3. The apparatus according to claim 1, wherein
   the trained model relates and outputs, with regard to each pixel of the acquired first image data, a degree of certainty of being the area, and
   the processing circuitry is further configured to:
   estimate a plurality of areas that are set by using different thresholds in accordance with the degree of certainty,
   extract each of the areas from the first image data to acquire a plurality of sets of second image data, and
   receive an operator's operation to select, as the second image data, one of the sets of second image data.

4. An apparatus comprising processing circuitry configured to:
   acquire first image data that is image data obtained during ultrasound scan executed on an object and that is image data before coordinate conversion corresponding to a format of the ultrasound scan, and
   use a trained model generated through learning using the first image data obtained during the previously executed ultrasound scan and an area including the object in the first image data to estimate the area in the acquired first image data,
   execute the coordinate conversion on the acquired first image data to obtain second image data,
   execute the coordinate conversion on the estimated area to obtain an area having undergone the coordinate conversion,
   extract the area having undergone the coordinate conversion from the second image data to obtain third image data, and
   causes a display to display the third image data.

5. The apparatus according to claim 4, wherein the processing circuitry is further configured to:
   before the extracting is executed, receive an operator's operation to change an outline of the area having undergone the coordinate conversion, and
   extract the area changed in accordance with the operator's operation from the second image data to obtain the third image data.

6. The apparatus according to claim 1, wherein the first image data is three-dimensional image data.

7. The apparatus according to claim 1, wherein the processing circuitry is further configured to:
   execute rendering on the third image data to generate a rendering image,
   generate a cross-sectional image on a predetermined cross-section from the third image data, and
   cause a display to display the rendering image and the cross-sectional image.

8. The apparatus according to claim 7, wherein the processing circuitry is further configured to:
   generate a curved line representing an outline of the estimated area on the predetermined cross-section, and
   cause the display to display the curved line and the cross-sectional image in a superimposed manner.

9. The apparatus according to claim 1, wherein the learning and the estimating are executed after the first image data is decimated in a depth direction.

10. An apparatus comprising a processing circuitry configured to:
    acquire first image data that is image data obtained during ultrasound scan executed on an object and that is image data different from image data displayed on a display, and
    use a trained model generated through learning using the first image data obtained during the previously executed ultrasound scan and an area including the object in the first image data to estimate the area in the acquired first image data,
    extract the estimated area from the acquired first image data to obtain second image data,
    execute coordinate conversion on the second image data to obtain third image data, and
    cause a display to display the third image data.

11. A trained-model generation device comprising a processing circuitry configured to acquire, as a data set, first image data that is image data obtained during previously executed ultrasound scan on an object and that is image data before coordinate conversion corresponding to a format of the ultrasound scan and an area including the object in the first image data, and learn a pattern of the area from the acquired data set to generate a trained model that has a function to, in response to an input of the first image data obtained by executing the ultrasound scan, estimate the area in the first image data, extract the estimated area from the acquired first image data to obtain second image data, execute the coordinate conversion on the second image data to obtain third image data, and cause a display to display the third image data.

12. The apparatus according to claim 4, wherein the first image data is three-dimensional image data.

13. The apparatus according to claim 4, wherein the learning and the estimating are executed after the first image data is decimated in a depth direction.

\* \* \* \* \*